United States Patent
Watanabe

(10) Patent No.: US 7,433,454 B2
(45) Date of Patent: Oct. 7, 2008

(54) METHOD FOR DISPLAYING CALLING PARTY INFORMATION IN NETWORK TELEPHONE SYSTEM, AND NETWORK TELEPHONE SYSTEM, GATEWAY APPARATUS, AND INFORMATION TERMINAL

(75) Inventor: Kenichi Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 349 days.

(21) Appl. No.: 10/392,816

(22) Filed: Mar. 21, 2003

(65) Prior Publication Data

US 2003/0198323 A1    Oct. 23, 2003

(30) Foreign Application Priority Data

Mar. 22, 2002    (JP)    ............................ P2002-081775

(51) Int. Cl.
*H04M 1/56* (2006.01)
*H04M 15/06* (2006.01)

(52) U.S. Cl. ............................... 379/142.1; 379/142.01; 379/142.15; 455/415

(58) Field of Classification Search ............ 379/421.01, 379/142.04, 142.06, 142.08, 142.13, 142.15, 379/142.17, 88.11, 88.12, 88.13, 88.19, 93.23, 379/142.01; 455/415, 412.2
See application file for complete search history.

(56) References Cited

U.S. PATENT DOCUMENTS

| | | | | |
|---|---|---|---|---|
| 6,009,308 | A * | 12/1999 | Matsuura | 340/7.1 |
| 6,404,764 | B1 * | 6/2002 | Jones et al. | 370/352 |
| 6,442,264 | B1 * | 8/2002 | Sutter | 379/142.07 |
| 6,529,500 | B1 * | 3/2003 | Pandharipande | 370/352 |
| 6,665,388 | B2 * | 12/2003 | Bedingfield | 379/142.01 |
| 6,725,045 | B2 * | 4/2004 | Oren et al. | 455/445 |
| 6,728,360 | B1 * | 4/2004 | Brennan | 379/211.04 |
| 6,813,344 | B1 * | 11/2004 | Lemke | 379/142.06 |
| 6,891,826 | B2 * | 5/2005 | Onuma | 370/353 |
| 6,937,880 | B2 * | 8/2005 | Teranishi | 455/567 |
| 6,970,543 | B2 * | 11/2005 | Lautenschlager et al. | 379/142.04 |
| 6,996,226 | B2 * | 2/2006 | Watanabe | 379/355.03 |
| 7,085,257 | B1 * | 8/2006 | Karves et al. | 370/352 |
| 2003/0063733 | A1 * | 4/2003 | Levine et al. | 379/211.04 |
| 2003/0215079 | A1 * | 11/2003 | Watanabe | 379/219 |
| 2004/0248560 | A1 * | 12/2004 | Bedingfield et al. | 455/412.2 |

FOREIGN PATENT DOCUMENTS

JP    6-46120 A    2/1994
JP    2001-156906 A    6/2001

* cited by examiner

*Primary Examiner*—Quoc D Tran
(74) *Attorney, Agent, or Firm*—Birch, Stewart, Kolasch & Birch, LLP

(57) ABSTRACT

An object of the invention is to enable the user, in the case of a wired telephone, to check an incoming call even when the user is not present near the telephone and, regardless of the type of the telephone, enable the user to check calling party information when a call arrives. A gateway apparatus associates a PDA with a NET telephone connected to a LAN and, upon receiving an incoming call to the NET telephone, notifies the PDA of the calling telephone number received from a local exchange. When the incoming call notification is received from the gateway apparatus, the PDA causes a ringing tone to sound and displays the received calling telephone number. Further, based on the calling telephone number, the PDA searches telephone directory data stored therein and displays calling party information such as the caller's name.

24 Claims, 11 Drawing Sheets

FIG. 10

<<< INCOMING CALL

\>>>

---

ASANO ○○

06-7890-1234

NET TELEPHONE 4

---

METHOD FOR DISPLAYING CALLING PARTY INFORMATION IN NETWORK TELEPHONE SYSTEM, AND NETWORK TELEPHONE SYSTEM, GATEWAY APPARATUS, AND INFORMATION TERMINAL

BACKGROUND OF THE INVENTION

1. Field of the Invention

The invention relates to a method for displaying calling party information in a network telephone system that can access a public telephone network, a digital public telephone network, or the like via a communication network such as a LAN. The invention also relates to a network telephone system, a gateway apparatus, and an information terminal.

2. Description of the Related Art

It is known to provide a telephone communication system that accesses a public telephone network or a digital public telephone network, or even a closed telephone network such as a leased line network within a private organization, via a communication network constructed as a LAN (Local Area Network) within a building or the like.

Traditionally, certain types of telephones connected to a public telephone network or a digital public telephone network have been equipped with a function to display, upon arrival of an incoming call, the calling telephone number information of which the called party is notified through a calling number display service. Telephones of the type that displays information such as the caller's name by searching internally stored telephone directory data based on the received calling telephone number information have also been commercially implemented. There has also been implemented a telephone communication system in which incoming calls from an external public network can be routed to particular one or more telephones by means of a gateway apparatus or a private branch exchange (PBX) accommodated in a communication network constructed within a building or the like.

Japanese Unexamined Patent Publication JP-A 2001-156906 (2001) proposes a method in which, when a call arrives to a wireless communication terminal connected to a PHS (Personal Handyphone System) network, a mobile telephone network, or the like, the calling telephone number information received at that time is also transmitted to another information processing apparatus by using a short-range wireless communication technology, to display the calling telephone number information along with a message indicating the arrival of a call. This prior art method is intended to provide a reliable indication of an incoming call and an identification of the identity of the caller even when the wireless communication terminal such as a mobile telephone is set to a ringer-off mode or a vibration or like operation mode.

Generally, in the case of a wired telephone, unlike a portable wireless telephone such as a PHS or a mobile telephone, even when the telephone terminal is equipped with a calling party information display function, if a user is at some distance away from the telephone at the time of the arrival of a call, the user is unable to check the calling telephone number information and, depending on the situation, even the ringing tone cannot be heard. If the connected telephone does not have means for displaying the calling telephone number information, there is no way of checking the calling party. Further, in the case of a telephone terminal that also displays the caller's name by searching an internally stored telephone directory based on the received calling telephone number information, even when a personal information database such as an address book is stored in a PDA (Personal Digital Assistant) terminal that is usually carried by the user, the user has to re-enter the personal information into the telephone terminal if the calling party information is to be displayed on the telephone terminal. Hence, there is a problem that cumbersome entering operation is required and its availability is poor.

Here, there are cases where the personal information entered into the telephone terminal can also be used as a telephone directory for making outgoing calls. On the other hand, in Japanese Unexamined Patent Publication JP-A 6-46120 (1994), there is proposed a method that automatically makes a call by retrieving the desired telephone number from internally stored telephone directory data by operating an electronic organizer having a telephone directory function. In this case, entering the personal information into the telephone terminal is necessary only for having the calling telephone number information displayed.

SUMMARY OF THE INVENTION

It is an object of the invention to provide a method for displaying calling party information in a network telephone system, which in the case of a wired telephone, enables the user to check the calling party information even when the user is away from the telephone, and which, regardless of the type of the telephone, enables the user to check the calling party information when a call arrives. It is also an object of the invention to provide a network telephone system, a gateway apparatus, and an information terminal for implementing such a method.

The invention provides a method for displaying calling party information received from an external public network, in a network telephone system in which a telephone terminal for communication network connection and an information terminal are connected to the external public network via a gateway apparatus having a protocol conversion function and other functions, the method comprising:

managing the telephone terminal and the information terminal by the gateway apparatus by associating the telephone terminal with the information terminal, when the calling party information transmitted from the external public network to the telephone terminal is received, allowing the gateway apparatus to notify the information terminal associated with the telephone terminal to which the information is to be transmitted, of the received calling party information, and displaying the calling party information on the information terminal which is notified of the calling party information.

According to the invention, in the network telephone system, the telephone terminal for communication network connection and the information terminal are connected to the gateway apparatus. The gateway apparatus is also connected to the external public network, and is equipped with a protocol conversion function and other functions. The telephone terminal and the information terminal are managed by the gateway apparatus by associating the telephone terminal with the information terminal. When the calling party information transmitted from the external public network to the telephone terminal is received, the gateway apparatus notifies the information terminal associated with the telephone terminal to which the information is to be transmitted, of the received calling party information. Since the calling party information is displayed on the information terminal that received the information, if the telephone terminal is a wired telephone, the user can check the calling party information even when the user is away from the telephone. Furthermore, regardless of the type of the telephone, for example, even in the case of a telephone that does not have a function to display the calling party information, the user can check the calling party information when a call arrives.

In the invention it is preferable that the calling party information is transmitted when an incoming call to the telephone terminal arrives from the external public network.

According to the invention, when an incoming call to the telephone terminal in the network telephone system arrives from the external public network, the calling party information is displayed on the information terminal so that the information can be checked without fail.

In the invention it is preferable that the calling party information is transmitted when an interrupt request to the telephone terminal during a call occurs from a third party.

According to the invention, when an interrupt request from a third party is received through a call-waiting service or the like during a call, the calling party information concerning the third party is displayed on the information terminal associated with the telephone terminal engaged in the call, so that the user can check the calling party information concerning the third party, regardless of the type of the telephone.

The invention also provides a network telephone system comprising:

a telephone terminal for communication network connection;

a information terminal; and a gateway apparatus having a protocol conversion function and other functions for connection to an external public network, wherein the gateway apparatus manages the telephone terminal and the information terminal by associating the telephone terminal with the information and, when the calling party information transmitted from the external public network to the telephone terminal is received, the gateway apparatus notifies the information terminal associated with the telephone terminal to which the information is to be transmitted, of the received calling party information, and the information terminal which is notified of the calling party information displays the received calling party information.

According to the invention, the network telephone system, which comprises the telephone terminal for communication network connection and the gateway apparatus, further comprises the information terminal, and the gateway apparatus having the protocol conversion function and other functions for connection to the external public network manages the telephone terminal and the information terminal by associating the telephone terminal with the information terminal. When the calling party information transmitted from the external public network to the telephone terminal is received, the gateway apparatus notifies the information terminal associated with the telephone terminal to which the information is to be transmitted, of the received calling party information, and the information terminal which is notified of the calling party information displays the received calling party information. This provision serves to improve the chance that the user can check the calling party information, since the calling party information is displayed on the information terminal, regardless of whether the telephone terminal is equipped with a function to display the calling party information or whether the user is present near the telephone terminal.

In the invention it is preferable that the external public network to which the gateway apparatus is connected includes at least two networks selected from among an analog telephone network, a packet communication telephone network, and a broadband telephone network.

According to the invention, the calling party information can be displayed on the information terminal when performing telephone and data communications by connecting the telephone network system to the external public network, such as an ordinary analog telephone line, a packet communication telephone network based on VoIP (Voice over Internet Protocol) or the like, or a broadband telephone network based on VoDSL (Voice over Digital Subscriber Line) or the like.

In the invention it is preferable that the information terminal is a portable terminal that a user can carry, and communicates information with the gateway apparatus via a wireless link.

According to the invention, since the information terminal is of a portable type and can be carried around by the user, the user can check the calling party information upon arrival of an incoming call, even when the user is away from any telephone terminal with which the information terminal is preassociated.

The invention also provides a gateway apparatus which, together with a telephone terminal for communication network connection and an information terminal, forms a network telephone system, and which has a protocol conversion function and other functions for connection to an external public network, the gateway apparatus comprising:

managing means for managing the telephone terminal and the information terminal by associating the telephone terminal with the information terminal;

receiving means for receiving calling party information transmitted from the external network to the telephone terminal; and notifying means for searching through the managing means for the information terminal associated with the telephone terminal to which the calling party information received by the receiving means is to be transmitted, and for notifying the searched information terminal of the received calling party information.

According to the invention, the gateway apparatus which, together with the telephone terminal for communication network connection and the information terminal, forms the network telephone system, has the protocol conversion function and other functions for connection to the external public network and comprises the managing means, the receiving means, and the notifying means. The managing means manages the telephone terminal and the information terminal by associating the telephone terminal with the information terminal, and the receiving means receives calling party information transmitted from the external network to the telephone terminal. The notifying means searches through the managing means for the information terminal associated with the telephone terminal to which the calling party information received by the receiving means is to be transmitted, and notifies the searched information terminal of the received calling party information. Even when the user is not present near the destination telephone terminal, or when the telephone terminal is not equipped with a function to display the calling party information, the user can check the calling party information if the information can be viewed on the information terminal.

In the invention it is preferable that the managing means manages the status of every connected information terminal by performing communication with the information terminal at predetermined intervals of time, and when the information terminal which is to be notified of the calling party information does not respond to the communication from the managing means, the notifying means stores the calling party information of which the information terminal is to be notified, and when a response from the information terminal to the managing means is detected, the notifying means notifies the information terminal of the stored calling party information.

According to the invention, the managing means in the gateway apparatus manages the status of every information terminal connected to the network telephone system by performing communication, at predetermined intervals of time, with the information terminal associated with the telephone terminal that forms part of the network telephone system. When the information terminal which is to be notified of the calling party information by the notifying means does not respond to the communication from the managing means, the notifying means stores the calling party information of which the information terminal is to be notified, and when a response from the information terminal to the managing means is detected, the notifying means notifies the information terminal of the stored calling party information. Accordingly, when the user is absent, or when the information terminal is in an off state, the user can later check the incoming call history without fail.

Furthermore, according to the invention, the managing means in the gateway apparatus manages the status of every information terminal connected to the network telephone system by performing communication at predetermined intervals of time, and when the information terminal which is to be notified of the calling party information does not respond to the communication from the managing means, the notifying means stores the calling party information of which the information terminal is to be notified, and when a response from the information terminal to the managing means is detected, the notifying means notifies the information terminal of the stored calling party information. Accordingly, when the user is absent, or when the information terminal is in an off state, the user can later check the incoming call history without fail.

In the invention it is preferable that the gateway apparatus is capable of connecting to at least one external public network selected from among an analog telephone line, a packet communication telephone network, and a broadband telephone network.

According to the invention, when a call arrives to the telephone terminal in the network telephone system from at least one external public network, i.e., an analog telephone line, a packet communication telephone network, or a broadband telephone network, the calling party information can be displayed on the information terminal.

The invention also provides an information terminal connectable to a network telephone system which includes a telephone terminal for communication network connection and a gateway apparatus having a protocol conversion function and other functions for connection to an external public network, the information terminal comprising:

display control means for performing control so that calling party information transmitted from the external public network to the telephone terminal, and received by the gateway apparatus, is displayed on the information terminal when the information terminal is notified of the received calling party information from the gateway apparatus.

According to the invention, the information terminal is connectable to the network telephone system which includes the telephone terminal for communication network connection and the gateway apparatus having a protocol conversion function and other functions for connection to the external public network, and the information terminal includes the display control means. The display control means performs control so that the calling party information transmitted from the external public network to the telephone terminal, and received by the gateway apparatus, is displayed on the information terminal when the information terminal is notified of the received calling party information from the gateway apparatus. Accordingly, even when the telephone terminal connected to the network telephone system is not equipped with a function to display the calling party information, or when the telephone terminal does have such a display function but the user is away from the telephone terminal, the user can check the calling party information on the information terminal.

In the invention it is preferable that the information terminal further comprises information managing means for managing personal information including telephone numbers as a data base, and when the information terminal is notified of a telephone number as the calling party information from the gateway apparatus, the display control means searches the data base in the information managing means and, if personal information that matches the telephone number is found, performs control so as to display the thus found personal information together with information that identifies the telephone terminal to which the calling party information is directed.

According to the invention, the personal information including telephone numbers is managed as a data base in the information managing means, and when the information terminal is notified of the calling party information from the gateway apparatus, the personal information that matches the telephone number and the information that identifies the destination telephone terminal are displayed. Accordingly, by effectively using the personal information, the user can quickly check the information concerning the calling party and can easily identify the telephone terminal to be used to answer the call when the user chooses to accept the call.

In the invention it is preferable that the information terminal further comprises information storing means for storing the calling party information received from the gateway apparatus, and when a predetermined operation is performed, the display control means performs control so that the calling party information stored in the information storing means is displayed in the form of an incoming call history.

According to the invention, since information concerning the calling party who placed a call to the associated telephone terminal is stored as the calling party information and is later displayed in the form of an incoming call history in response to the entry of a predetermined operation, the user can easily call back the other party, for example, when the user was not able to answer the call on the spot.

In the invention it is preferable that the information terminal further comprises sounding means for sounding a ringing tone when the information terminal is notified of the calling party information from the gateway apparatus.

According to the invention, when the information terminal is notified of the calling party information from the gateway apparatus and the calling party information is displayed, the arrival of the calling party information can be indicated to the user by means of the ringing tone. Accordingly, it is possible to allow the user to attend to the displayed calling party information.

The invention also provides a program for causing a computer to function as an information terminal as described in any of the above items.

According to the invention, the computer can be connected to the network telephone system and operated so as to display the calling party information transmitted from the external public network to the telephone terminal connected to the network telephone system.

The invention also provides a computer readable recording medium having a program recorded thereon for causing a computer to function as an information terminal as described in any of the above items.

According to the invention, by loading the recorded program into the computer, and connecting the computer to the network telephone system, the computer can be operated so as to display the calling party information transmitted from the external public network to the telephone terminal connected to the network telephone system.

BRIEF DESCRIPTION OF THE DRAWINGS

Other and further objects, features, and advantages of the invention will be more explicit from the following detailed description taken with reference to the drawings wherein:

FIG. 10 is a view showing an example of a calling party information display produced by the PDA of FIG. 1.

DETAILED DESCRIPTION OF THE PREFERRED EMBODIMENTS

Figure 1:
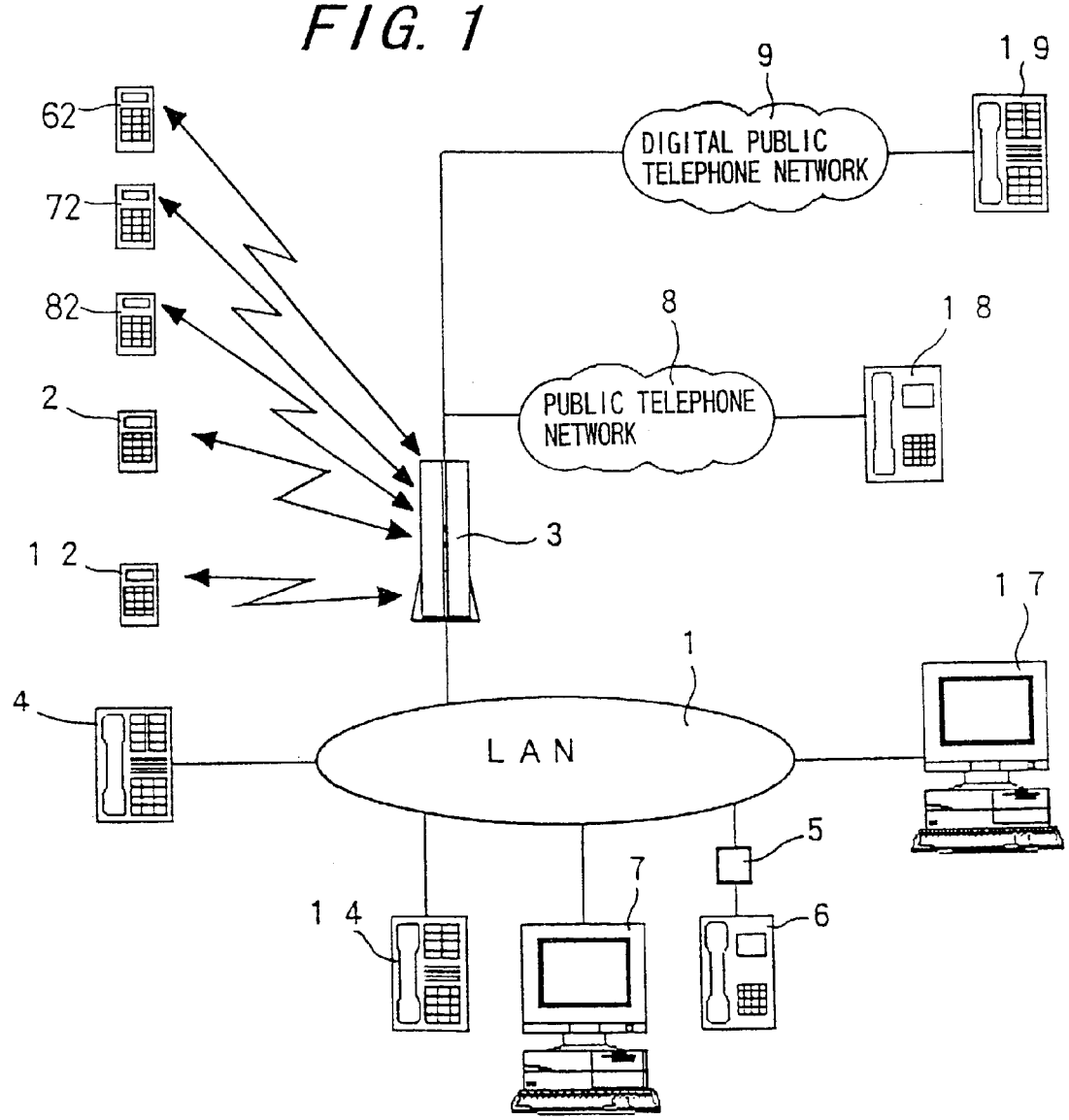
FIG. 1 is a block diagram showing in simplified form the configuration of a network telephone system according to one embodiment of the invention.

Now referring to the drawings, preferred embodiments of the invention are described below.

Referring to drawings, a network telephone system according to one embodiment of the invention will be described in detail below along with a method and configuration for displaying calling party information on a PDA terminal by way of a gateway apparatus by utilizing a personal information management data base incorporated in the PDA terminal.

FIG. 1 shows the general configuration of the network telephone system according to the present embodiment in which, when a call arrives, the PDA terminal receives calling telephone number information from the gateway apparatus. The network telephone system of the present embodiment includes a packet communication network constructed in the form of a ring-shaped local area network (hereinafter abbreviated "LAN") 1. The LAN 1 may be constructed using other network topologies such as a bus topology, and may be constructed as a wireless LAN or a fiber optic LAN. To the LAN 1 is connected a gateway apparatus 3 that is capable of communicating information with PDAs via a wireless link, and that is equipped with a logical or physical conversion function for connection to an external public network.

Many NET telephones 4 as telephone terminals for communication network connection, and ordinary telephones 6 via an ordinary telephone connecting adapter 5, are also connected to the LAN 1, to which is further connected a personal computer 7 as an information appliance. In the illustrated example, five PDAs, including the PDAs 12, 62, 72 and 82, are connected to the gateway apparatus 3 via a wireless link, two NET telephones, including the NET telephone terminal 14, one ordinary telephone, and two personal computers, including the personal computer 17, are connected to the LAN 1. NET telephones 4 and 14 are directly connected to the LAN 1 and are telephones that can perform communications by processing various network telephone system signals, such as voice signals and connection and disconnection signals. The ordinary telephone 6 is a traditional telephone to be connected to an analog public telephone line, and is connected to the LAN 1 via the ordinary telephone connecting adapter 5 provided therein as the ordinary telephone 6 cannot process network telephone system signals by itself. The ordinary telephone connecting adapter 5 performs conversion between various network telephone system signals, such as voice signals and connection and disconnection signals, and analog telephone signals, such as analog voice signals and on-hook and off-hook signals, that the ordinary telephone 6 can process. Using the ordinary telephone connecting adapter 5, the ordinary telephone 6 can be made to achieve functions equivalent to those of the NET telephone.

In the above system, not only a TCP/IP (Transmission Control Protocol/Internet Protocol) network but also a Home PNA (Home Phoneline Networking Alliance) or like network can be used for the LAN 1. Further, the LAN 1 may be constructed as a wireless LAN using Bluetooth or other wireless technology, with the PDAs 2, 12, 62, 72 and 82 and the NET telephones 4 and 14 configured as terminals of the wireless LAN.

The gateway apparatus 3 connected to the LAN 1 is equipped with a function to perform communication protocol conversion in voice communication between the ordinary telephone 18 accommodated in the public telephone network 8 and the NET telephones 4 and 14. The gateway apparatus 3 and the ordinary telephone 18 are connected via the public telephone network 8 which is an analog telephone line. The gateway apparatus 3 not only connects with the public telephone network 8, but can also connect with a digital public telephone network 9 for connection to an external NET telephone 19. Connection to the NET telephone 19 can be accomplished not only via the digital public network 9 such as a VoIP network but also via a broadband telephone network such as a VoDSL network.

A personal information management data base to be used by telephone directory application software, etc. is stored in each of the PDAs 2, 12, 62, 72 and 82. Using this data base, the caller's name associated with the calling telephone number received upon arrival of a call can be retrieved and displayed. To achieve this function, the PDAs 2, 12, 62, 72 and 82 are each equipped with application software for performing the operation processing procedure of the invention, that is, for receiving the calling telephone number from the gateway apparatus 3, searching the telephone directory data to retrieve calling party information such as the caller's name associated with the calling telephone number, and displaying the calling party information on the display.

Figure 2:
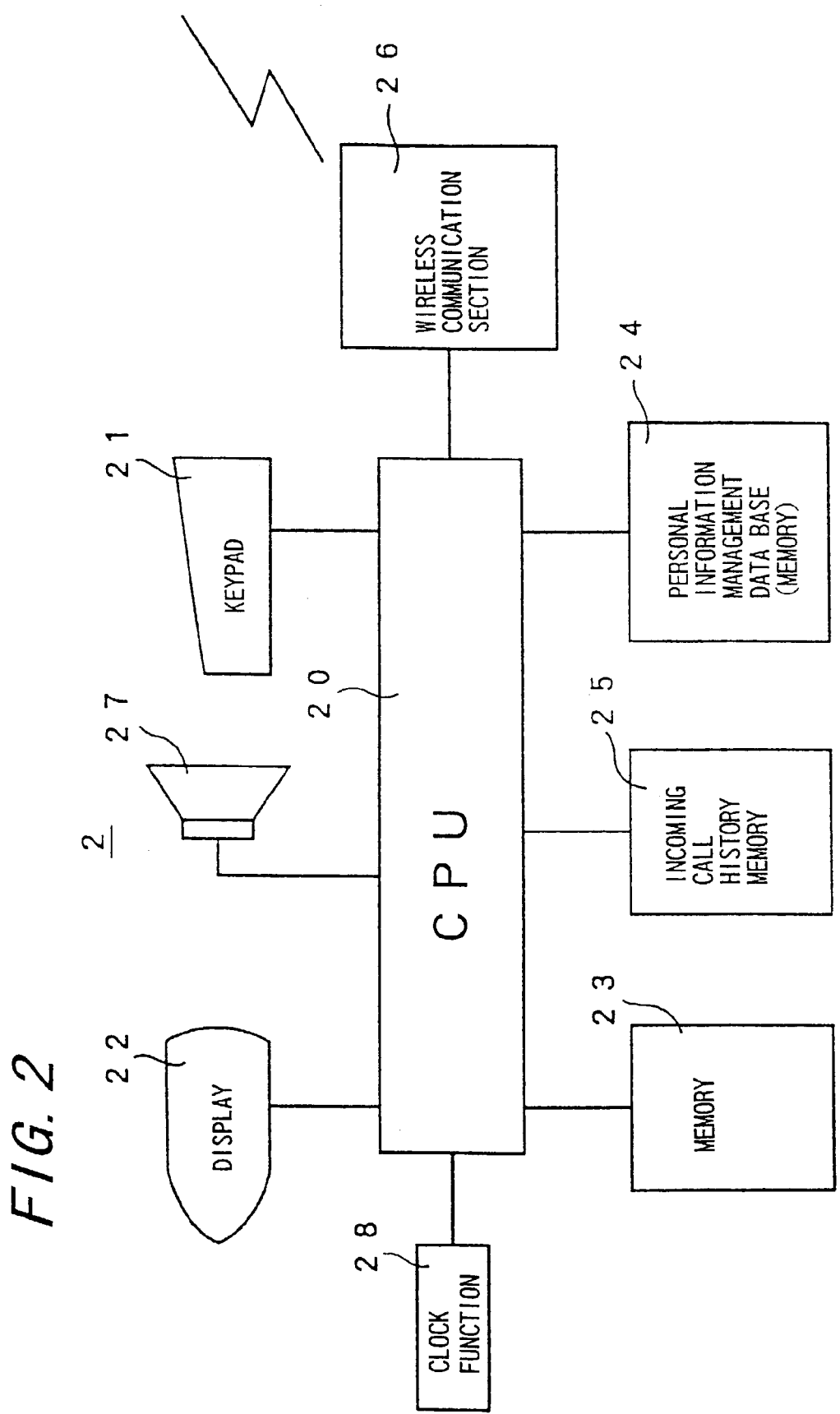
FIG. 2 is a block diagram showing in simplified form the electrical configuration of a PDA shown in FIG. 1.

FIG. 2 shows in simplified form the electrical configuration of the PDA 2 shown in FIG. 1. The PDAs 12, 62, 72 and 82 in FIG. 1 has a similar configuration. The PDA 2 includes a CPU 20, a keypad 21, a display 22, a memory 23, a personal information management data base 24 serving as information managing means, an incoming call history memory 25 serving as information storing means, a wireless communication section 26, a speaker 27 serving as sounding means, and a clock function 28.

The keypad 21 is an input device that the user operates to activate the various functions of the information terminal. The display 22 is constructed from an LCD (Liquid Crystal Display) or the like to display the calling party information and other information necessary to perform the various function. The personal information management data base 24 is implemented using a memory for storing the telephone directory data. The incoming call history memory 25 can store a history of incoming calls. The memory 23 stores other information as well as programs for operation of the CPU 20. The wireless communication section 26 performs communication with the gateway apparatus 3. The speaker 27 can produce a ringing tone indicating the arrival of a call. A buzzer may be used instead of the speaker 27. The clock function 28 is used to record the date and time of every incoming call in the incoming call history. The CPU 20 controls the various functional elements.

Figure 3:
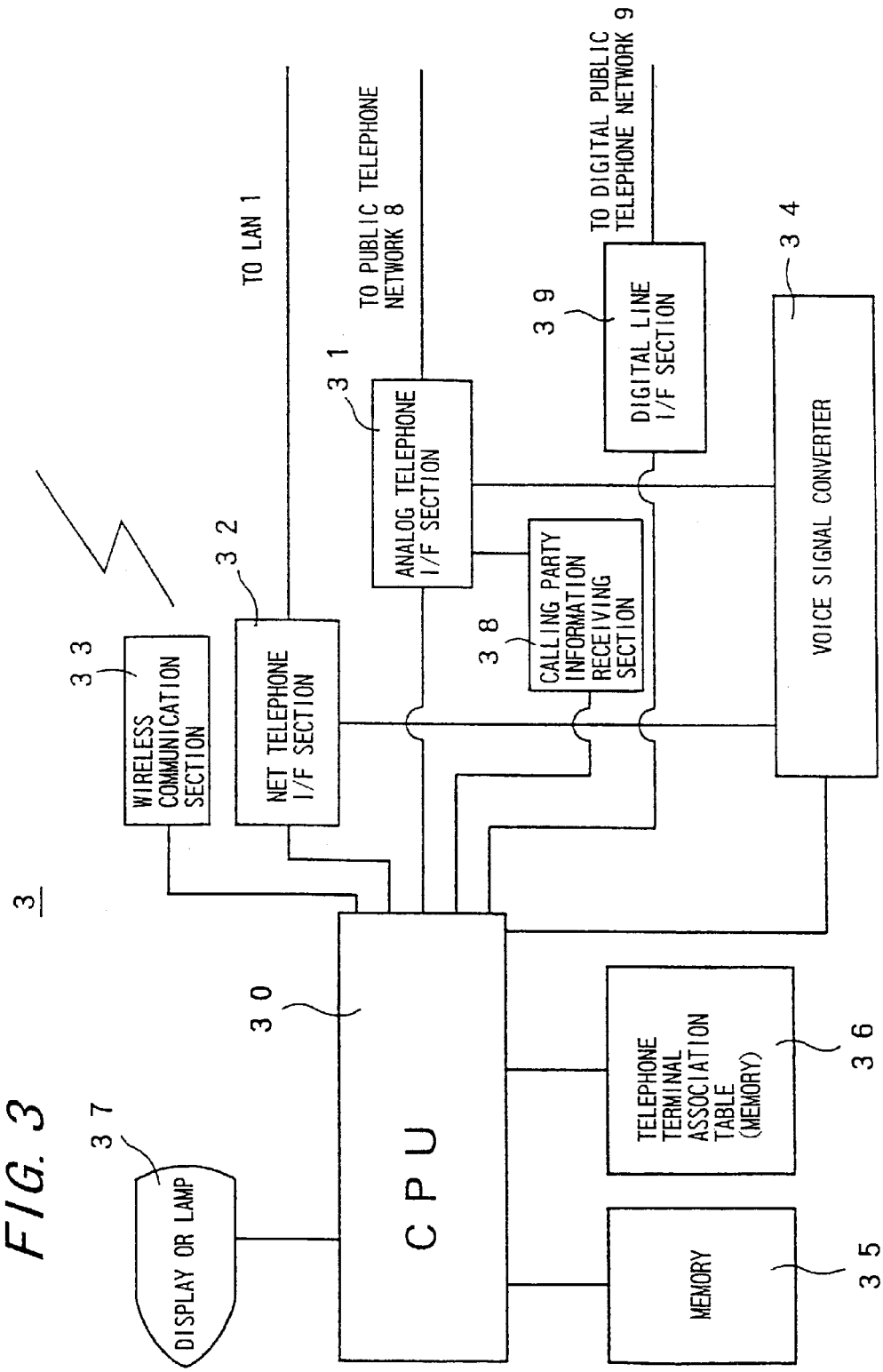
FIG. 3 is a block diagram showing in simplified form the electrical configuration of a gateway apparatus shown in FIG. 1.

FIG. 3 shows in simplified form the electrical configuration of the gateway apparatus shown in FIG. 1. The gateway apparatus 3 includes, in addition to a CPU 30, an analog telephone I/F (interface) section 31 for interfacing with the public telephone network 8 and a NET telephone I/F section 32 for interfacing with the LAN 1. The gateway apparatus 3 further includes a wireless communication section 33, a voice signal converter 34, a memory 35, a telephone terminal association table 36 serving as managing means, a display or lamp 37, a calling party information receiving section 38 serving as receiving means, and a digital line I/F section 39.

The wireless communication section 33 performs wireless communication with the PDAs 2 and 12. The voice signal converter 34 converts the analog signal from the public telephone network 8 into a digital signal for processing in the LAN 1 and vice versa. The telephone terminal association table 36 is a memory that stores the associations between the information terminals, including the PDAs 2 and 12 and the personal computers 7 and 17, and the telephone terminals, including the NET telephones 4 and 14 and the ordinary telephone 6, connected to the LAN 1. The memory 35 stores other information as well as programs for operation of the CPU 30. The state of the gateway apparatus 3 is indicated using a display device such as an LCD or LED (Light Emitting Diode) or the lamp 37. The calling party information receiving section 38 receives, upon arrival of a call, the calling telephone number of which the called party is notified from a local exchange in the public telephone network 8 and the digital public telephone network 9. The CPU 30 is responsible for the overall control of the apparatus. The digital line I/F section 39 is included to provide for the connection to the digital public telephone network 9. A modem function for connection to an ADSL network or a cable telephone network and a protocol conversion function for connection to other VoIP networks are also included.

Figure 4:
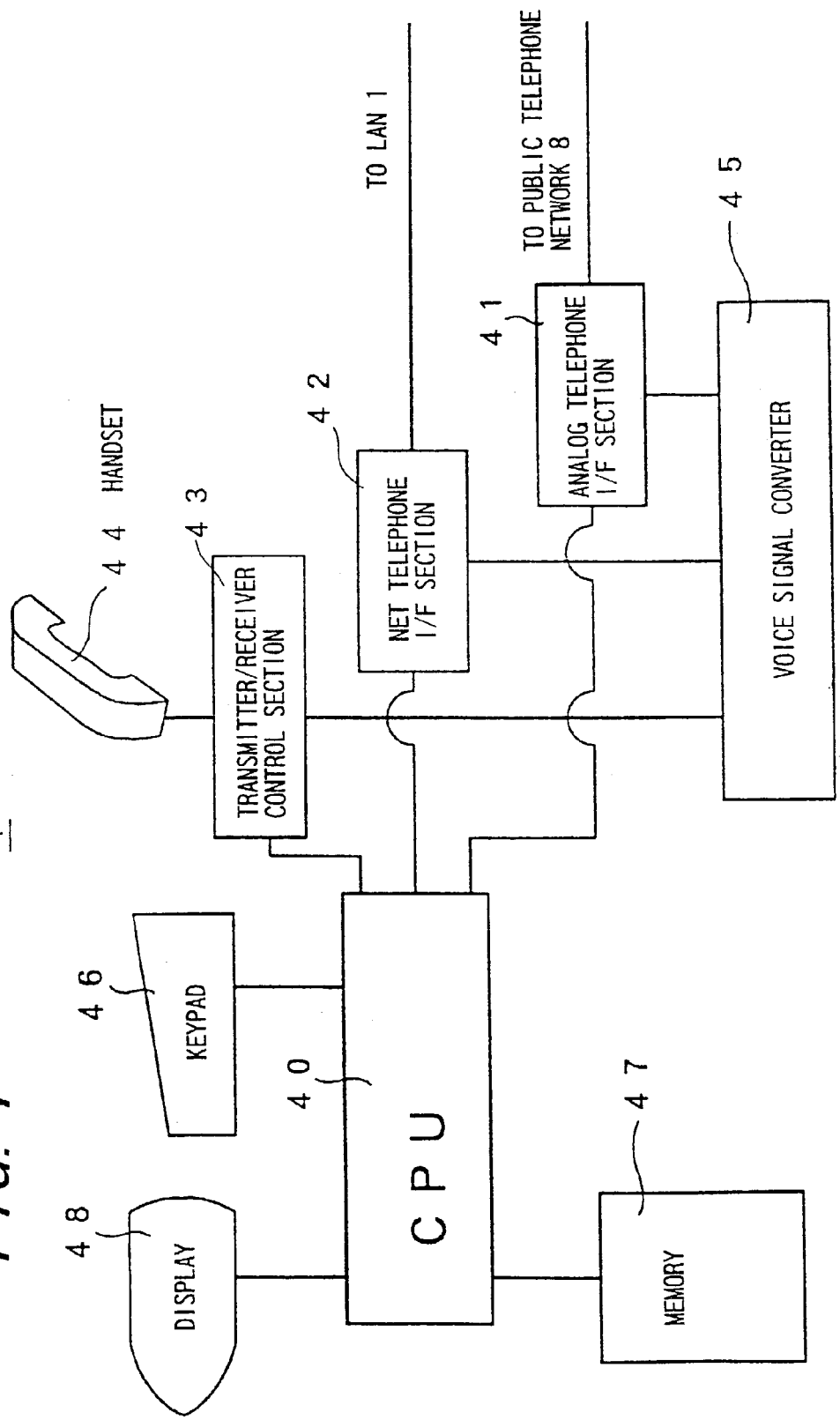
FIG. 4 is a block diagram showing in simplified form the electrical configuration of a NET telephone shown in FIG. 1.

FIG. 4 shows in simplified form the electrical configuration of the NET telephone 4 shown in FIG. 1. The NET telephone 14 in FIG. 1 has a similar configuration. The NET telephone 4 includes a CPU 40, an analog telephone I/F section 41, a NET telephone I/F section 42, a transmitter/receiver control section 43, a handset 44, a voice signal converter 45, a keypad 46, a memory 47, and a display 48.

The NET telephone I/F section 42 is provided for connection to the LAN 1. The transmitter/receiver control section 43 is provided to enable voice communication with the handset 44 connected to it and also to perform voice volume control, etc. The voice signal converter 45 is provided to perform voice conversion between analog and digital voice signals. The keypad 46 is provided for the user to perform call initiation operations and make various settings. The memory 47 is provided to store information necessary for operating the various functions of the NET telephone 4. The display 48 is provided to display the state of the telephone function, the entered number, etc. The analog telephone I/F section 41 is provided to enable the NET telephone 4, when connected to a Home PNA network, to connect directly with the public telephone network 8 as an analog telephone without the intervention of the gateway apparatus 3, especially when a power failure occurs. The CPU 40 controls each section.

Figure 5:
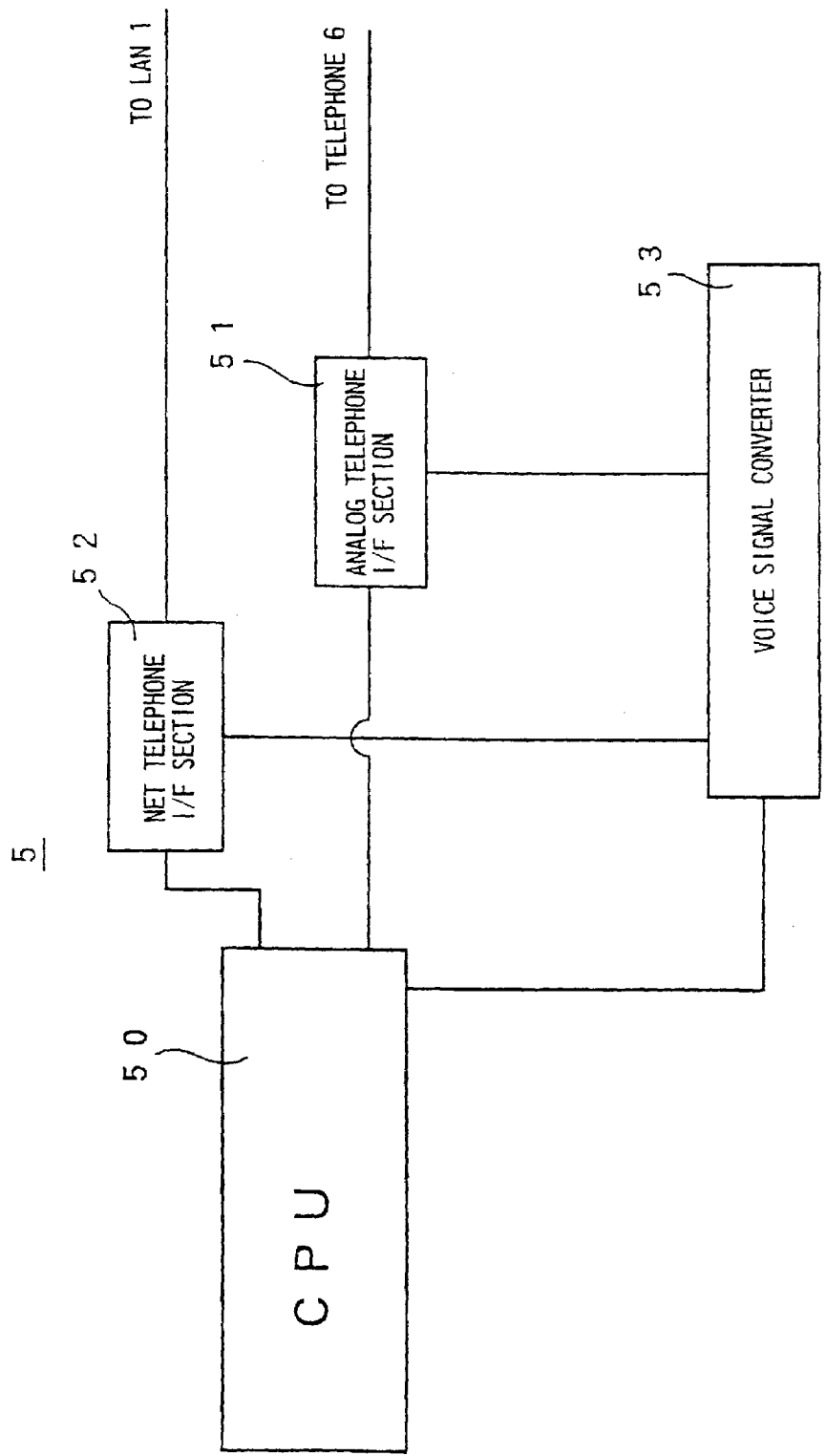
FIG. 5 is a block diagram showing in simplified form the electrical configuration of an ordinary telephone connecting adapter shown in FIG. 1.

FIG. 5 shows in simplified form the electrical configuration of the ordinary telephone connecting adapter 5 used to connect the ordinary telephone 6 to the LAN 1 in FIG. 1. The ordinary telephone connecting adapter 5 includes a CPU 50, an analog telephone I/F section 51, a LAN I/F section 52, and a voice signal converter 53. The LAN I/F 52 is provided for connection to the LAN 1, while the analog telephone I/F section 51 is provided to connect the ordinary telephone 6. Voice conversion between analog and digital voice signals is performed by the voice signal converter 53. The CPU 50 is responsible for the overall control of the adapter.

The operation of the present embodiment will be described below. First, an outline of the operation will be given with reference to FIG. 1. The operation hereinafter described deals with the case in which, when a call arrives, the gateway apparatus 3 receives the calling telephone number of which the called party is notified from the central office exchange, searches for the PDA 2, 12, 62, 72 and 82 associated with the called telephone, and passes the calling telephone number to the associated PDA 2, 12, 62, 72 and 82 which thereupon displays the calling party information.

In FIG. 1, when an incoming call arrives on a telephone line from an external public network (the public telephone network 8 or the digital public telephone network 9) connected to the gateway apparatus 3, for example, from the ordinary telephone 18 connected to the public telephone network 8 or the NET telephone 19 connected to the digital public telephone network 9, the gateway apparatus 3, like an ordinary private branch exchange, routes the incoming call to one or more particular telephones designated from among the telephones connected to the LAN 1. At this time, the called party is notified of the calling telephone number from the central office exchange through a calling number notification service such as the Number Display. Before the calling telephone number is received by the called telephone, the calling number is intercepted by the gateway apparatus 3 directly connected to the external public network.

Next, the gateway apparatus 3 notifies the PDA terminal, for example, the PDA 2, associated with the called telephone, of the calling telephone number, received from the central office exchange. The PDA 2 associated with the called telephone searches the preregistered personal information management data base by referring to the calling telephone number received from the gateway apparatus 3. When the corresponding calling party was successfully retrieved, the calling telephone number received from the gateway apparatus 3 and the calling party information, such as the caller's name, retrieved from the personal information management data base are displayed on the display 22.

In this network telephone system, PDA terminals must be associated in advance with corresponding telephones. First, a brief description of the association will be given. The association between a PDA terminal and a telephone terminal is established by operating the PDA terminal, and stored in the telephone terminal association table 36 within the gateway apparatus 3. A method of registering the association in the telephone terminal association table 36 will be described later.

Figure 6:
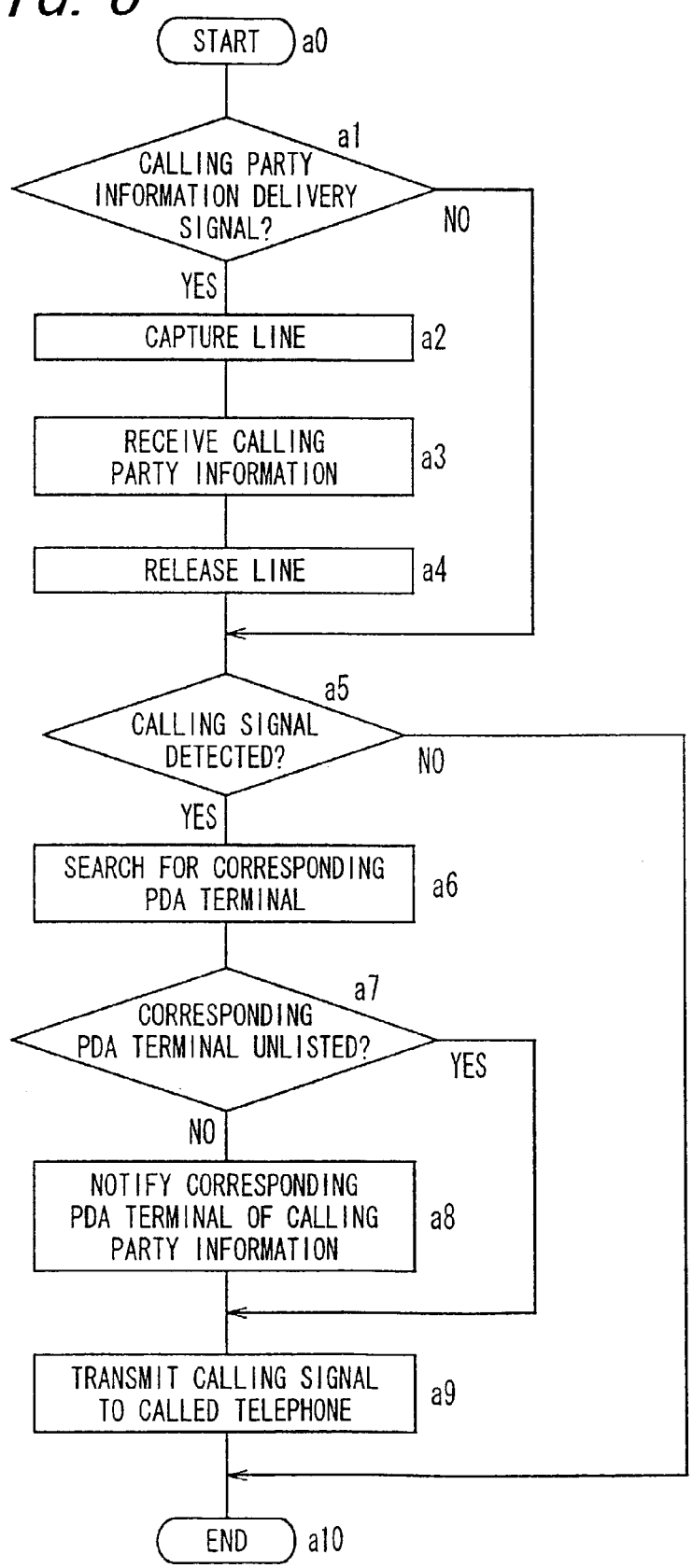
FIG. 6 is a flow chart illustrating the processing performed by the gateway apparatus of FIG. 1 when an incoming call arrives.
Figure 7:
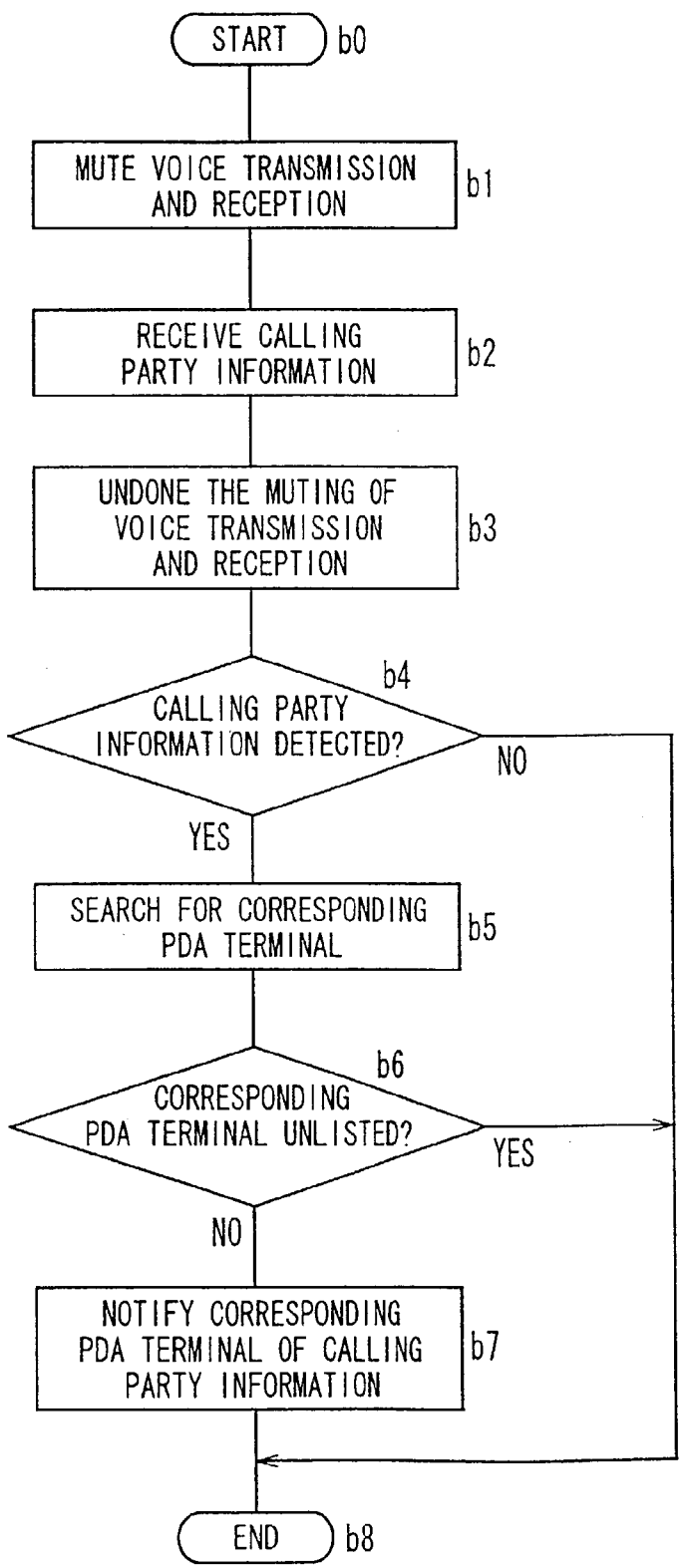
FIG. 7 is a flow chart illustrating the processing performed by the gateway apparatus of FIG. 1 when an interrupt request occurs.
Figure 8:
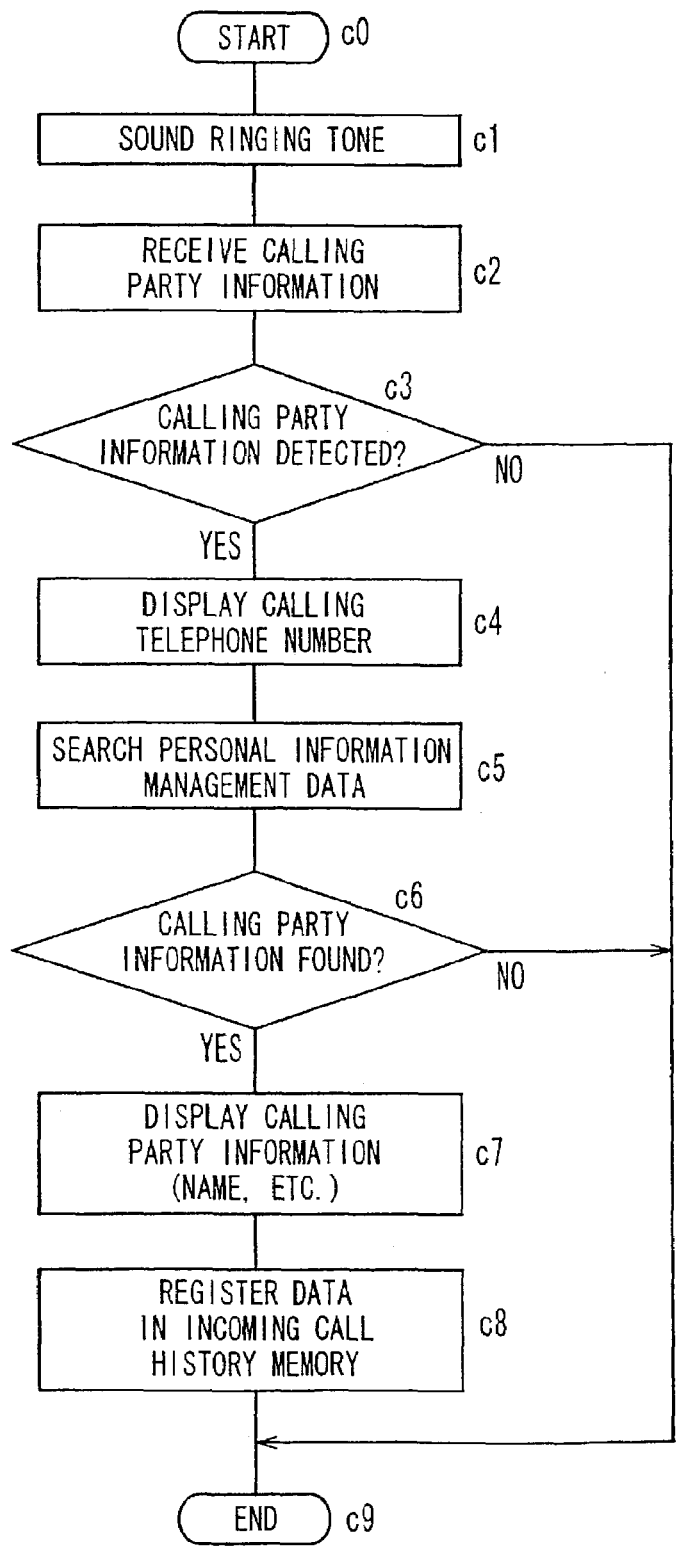
FIG. 8 is a flow chart illustrating the processing performed in the PDA of FIG. 1 when displaying calling party information.

Next, referring to FIGS. 6, 7, and 8, a detailed description will be given of how the gateway apparatus 3 notifies the PDA 2, 12, 62, 72 or 82 at the time of arrival of a call of the calling telephone number and how the PDA 2, 12, 62, 72, or 82 displays the calling party information. FIGS. 6, 7, and 8 show the process in which when a call arrives, the gateway apparatus 3 receives the calling telephone number from the central office exchange, searches for the PDA 2, 12, 62, 72 or 82 associated in advance with the called telephone number, and passes to the associated PDA 2, 12, 62, 72 or 82 the calling telephone number received from the central office exchange, and the process in which the PDA 2, 12, 62, 72 or 82 that received the notification of an incoming call and the calling telephone number from the gateway apparatus 3 retrieves the calling party information such as the caller's name from the personal information management data base by referring to the received calling telephone number, and displays the calling telephone number, caller's name, etc.

In an ordinary private branch exchange (PBX), a plurality of public telephone lines assigned different telephone numbers are accommodated, or Dial In or like service is used to deliver an incoming call to a particular telephone designated from among the telephones served by the PBX. In the network telephone system of the present embodiment also, the gateway apparatus 3 delivers an incoming call arriving from the public telephone network 8 to a designated telephone, just as a PBX does. The embodiment will be described below by considering the case where an incoming call is routed to the NET telephone 4.

FIG. 6 illustrates the processing performed by the gateway apparatus 3 when an incoming call arrives. The process starts with step a0, in which the gateway apparatus 3 constantly monitors the state of each telephone line (from the public telephone network 8 or the digital public telephone network 9) connected to the gateway apparatus 3, and detects the arrival of a call when a call arrives on any telephone line from the ordinary telephone 18 connected to the public telephone network 8 or the NET telephone 19 connected to the digital public telephone network 9. In the Number Display service, the calling signal pattern is different from the usual pattern but is an activation signal for calling party information notification. The gateway apparatus 3, upon detecting the arrival of a call on any telephone line connected to it, checks the pattern of the activation signal at step a1, and if the pattern is determined to be the pattern of the activation signal for calling party information notification, the gateway apparatus 3 captures the telephone line at step a2, receives at step a3 the calling party information of which the called party is notified in the form of a modem signal from the central office exchange in the calling party information receiving section 38, and releases the telephone line at step a4, after which the process proceeds to step a5. If, at step a1, it is determined that the pattern does not match that of the activation signal for calling party information notification, the process jumps to step a 5 by skipping the calling party information receiving process.

At step a5, the usual calling signal is transmitted from the central office exchange, and the gateway apparatus 3 detects it as the calling signal. If, at this point, the usual calling signal is not detected, this means that the calling procedure was discontinued, and the process is therefore terminated. If the calling signal is detected, the gateway apparatus 3, based on the telephone/PDA terminal association data preregistered in the telephone terminal association table 36, searches at step a6 for the PDA 2, 12, 62, 72 or 82 which is to be notified of the information, and checks the result at step a7.

Table 1 shown below is an example of the PDA/telephone terminal association table. In this example, the telephones include the NET telephones 4 and 14 and the ordinary telephone 6 shown in FIG. 1, and the PDA terminals include the PDAs 2, 12, 62, 72 and 82 and the personal computers 7 and 17 (each abbreviated "PC") shown in FIG. 1. In the table, "1" indicates that the PDA terminal is associated with the telephone, and "0" indicates that the PDA terminal is not associated with the telephone.

TABLE 1

|  | NET TELEPHONE 4 | NET TELEPHONE 14 | ORDINARY TELEPHONE 6 |
|---|---|---|---|
| PC 7 | 0 | 1 | 1 |
| PC 17 | 0 | 0 | 0 |
| PDA 2 | 1 | 0 | 1 |
| PDA 12 | 0 | 0 | 0 |
| PDA 62 | 0 | 1 | 0 |
| PDA 72 | 0 | 0 | 1 |
| PDA 82 | 1 | 1 | 1 |

From the telephone terminal association table shown in Table 1, it can be seen that the PDA 2 is associated with two telephone terminals, the NET telephone 4 and the ordinary telephone 6. In this setting, when an incoming call arrives to the NET telephone 4 or the ordinary telephone 6, the gateway apparatus 3 performs the notification of incoming call and the calling telephone number to the PDA 2. As shown, two PDA terminals, the PDA 2 and the PDA 82, are associated with the NET telephone 4. In this setting, when an incoming call arrives to the NET telephone 4, the gateway apparatus 3 performs the notification of incoming call and the calling telephone number to both the PDA 2 and the PDA 82.

As described above, in the example shown in Table 1, two PDA terminals, the PDA 2 and the PDA 82, are associated with the NET telephone 4. Therefore, both the PDA 2 and the PDA 82 are found as a result of the processing at step a6. If the result of the checking at step a7 shows that no PDA terminals are associated with the NET telephone 4, there is no need to notify any PDA terminal of the information. If it is found at step a7 that the PDAs 2 and 82 are the corresponding terminals, then at step a8 the gateway apparatus 3 notifies the PDAs 2 and 82 found at step a6 of the calling party information (calling telephone number) received at step a3 through the wireless communication section 33, and the process proceeds to step a9. If it is determined at step a7 that there are no corresponding PDA terminals, the process skips step a8 and proceeds to step a9.

At step a9, the gateway apparatus 3 transmits the calling signal to the NET telephone 4, causing the ringer in the NET telephone 4 to sound. Though not shown in the flowchart, provisions may be made for the gateway apparatus 3 to notify the NET telephone 4 of the calling party information, too, and have it displayed on the display 48 of the NET telephone 4. In this case, if the result of the processing at step a7 shows that there are no PDA terminals associated with the NET telephone 4, since the calling party information is transmitted directly to the NET telephone 4 and displayed on the display 48 of the NET telephone 4, the called party can check the calling party information before answering the call on the NET telephone 4. When the processing at step a9 is completed, or when no calling signal is detected at step a5, the entire process is terminated at step a10.

FIG. 7 illustrates the processing procedure performed by the gateway apparatus 3 when an interrupt request occurs from a third party. In the network telephone system of the present embodiment, when an interrupt request from a third party arrives through a call-waiting service or the like to a telephone engaged in a call, and the calling party information, such as the calling telephone number and the caller's name, concerning the new call is delivered to the gateway apparatus 3 from the central office exchange, the received calling party information can be passed to a PDA terminal connected to a communication network such as the LAN 1. The following describes the procedure performed when a new call arrives from a third party through a call-waiting service or the like to a telephone engaged in a call.

At step b0, the gateway apparatus 3 constantly monitors the state of the telephone line, and detects an incoming call on the telephone line when a new call arrives from a third party through a call-waiting service or the like to the telephone engaged in a call. In the Number Display service offered in combination with call-waiting service (Call Waiting Display service), notification of an incoming call is delivered by means of a specific DTMF (Dual Tone Multi Frequency) signal from the central office exchange. When the arrival of a new call through the call-waiting service is detected, the gateway apparatus 3 mutes the voice transmission and reception in the existing call at step b1 so that the modem signal will not be heard, and receives at step b2 the calling party information of which the called party is notified by means of the modem signal from the central office exchange, after which the muting of the voice transmission and reception is undone at step b3.

Next, at step b4, the presence or absence of calling party information is checked. If it is determined that there is calling party information, the gateway apparatus 3, based on the telephone/PDA terminal association data preregistered in the telephone terminal association table 36, searches at step b5 for PDA terminals which is notified of the information. According to the example shown in Table 1, two PDAs, the PDA 2 and the PDA 82, are associated with the NET telephone 4. Therefore, both the PDA 2 and the PDA 82 are found as a result of the processing at step b5. At step b6, the result of the searching is checked. Here, if no PDA terminals are associated with the NET telephone 4, there is no need to notify any PDA terminal of the information. Even when it is determined at step b6 that there is a corresponding PDA terminal, an audio interrupt tone is transmitted from the central office exchange to the NET telephone 4 through the call-waiting service or the like to let the called party talking on the NET telephone 4 know that a new call has arrived. Next, at step b8, the gateway apparatus 3 notifies the PDAs 2 and 82 found at step b5 of the calling party information (calling telephone number) received at step b2 through the wireless communication section 33.

Though not shown in the flowchart, provisions may be made for the gateway apparatus 3 to notify the NET telephone 4 engaged in the call of the calling party information, too, and have it displayed on the display 48 of the NET telephone 4. In this case, if the result of the processing at step b5 shows that there are no PDA terminals associated with the NET telephone 4, since the information is transmitted directly to the NET telephone 4 and displayed on the display 48 of the NET telephone 4, the called party can check the calling party information. When the processing at step b7 is completed, or when no corresponding PDA terminal is found at step b6, or when the result of the checking at step b4 shows that there is no calling party information received, the process is terminated at step b8.

FIG. 8 shows the processing performed in the PDA 2 as the associated PDA terminal when the PDA 2, as described above, has received the calling party information from the gateway apparatus 3 at the time of a call arrival. The process starts with step c0, and when notification of an incoming call is received from the gateway apparatus 3 through the wireless communication section 26, the speaker 27 of the PDA 2 is activated at step c1 to sound a ringing tone. At step c2, calling party information (calling telephone number) is received, and at step c3, the result is checked. If the reception of the calling party information (calling telephone number) is confirmed at step c3, the calling telephone number is displayed at step c4 on the display 22 of the PDA terminal. At step c5, the preregistered personal information management data base 24 is searched for the calling party information such as the caller's name by referring to the calling telephone number, and the result is checked at step c6.

If the result of the checking at step c6 shows that the calling party information has been successfully retrieved, the calling party information such as the caller's name thus retrieved is displayed at step c7 on the display 22 of the PDA 2. Further, at step c8, the calling telephone number received from the gateway apparatus 3, the calling party information such as the caller's name retrieved from the personal information management data base 24, and the call arrival date and time obtained from the internal clock function 28 of the PDA 2 are registered as incoming call history data in the incoming call history memory 25 within the PDA 2, after which the process is terminated at step c9. When the result of the checking at step c3 shows that there is no calling party information (calling telephone number), or when the result of the checking at step c6 shows that the corresponding calling party information has not been found in the personal information management data base 24, the process is terminated at step c9. Further, the incoming call history data registered in the incoming call history memory 25 is displayed on the display 22 by control of the CPU 20 according to the predetermined input operation to the keypad 21.

In this way, when there is an incoming call to the NET telephone 4, but the user is away from the NET telephone 4, or when there is an incoming call to the ordinary telephone 6 that does not have the function of receiving or displaying the calling party information, or in any other situation, since the calling party information is displayed on the PDA 2 that the user carries, the user can check the calling party information at all times. Furthermore, even when the user cannot answer an incoming call, since the record of every incoming call to any preregistered telephone is stored in the incoming call history memory 25 within the PDA 2 that the user carries, the user does not have to go to the trouble of checking the incoming call records on all the telephones, but can easily check all the incoming call records by just checking the incoming call history stored in the PDA 2 that the user carries.

Further, when the gateway apparatus 3 cannot notify the PDA 2 or 82 because the PDA 2 or 82 of the call arrival information in the case where the user carries is turned off or is located outside the communication range, the information of which the PDA is to be notified is stored in the internal memory 35 of the gateway apparatus 3. Then, the gateway apparatus 3 checks the status of the PDA 2 or 82 at predetermined intervals of time so that, when the communication link is reestablished, the calling party information stored in the internal memory 35 of the gateway apparatus 3 can be transmitted to the PDA 2 or 82 to notify that there was an incoming call. With this processing, information concerning any call that arrived while the PDA terminal was off is transmitted from the gateway apparatus 3 to the PDA terminal when power is turned on to the PDA terminal, and the incoming call record is stored in the incoming call history memory within the PDA terminal. Further, when there was an incoming call while the user carrying the PDA terminal was away from home, the information is transmitted from the gateway apparatus 3 to the PDA terminal when the user returns home, and the incoming call recorded is added in the incoming call history stored in the PDA terminal.

While the above embodiment has been described by taking the public telephone network 8 and the digital public telephone network 9 as examples of the external public network, it will be appreciated that the operation of the embodiment is also applicable, for example, to the case of a closed telephone network such as a leased line network within a private corporation.

Figure 9:
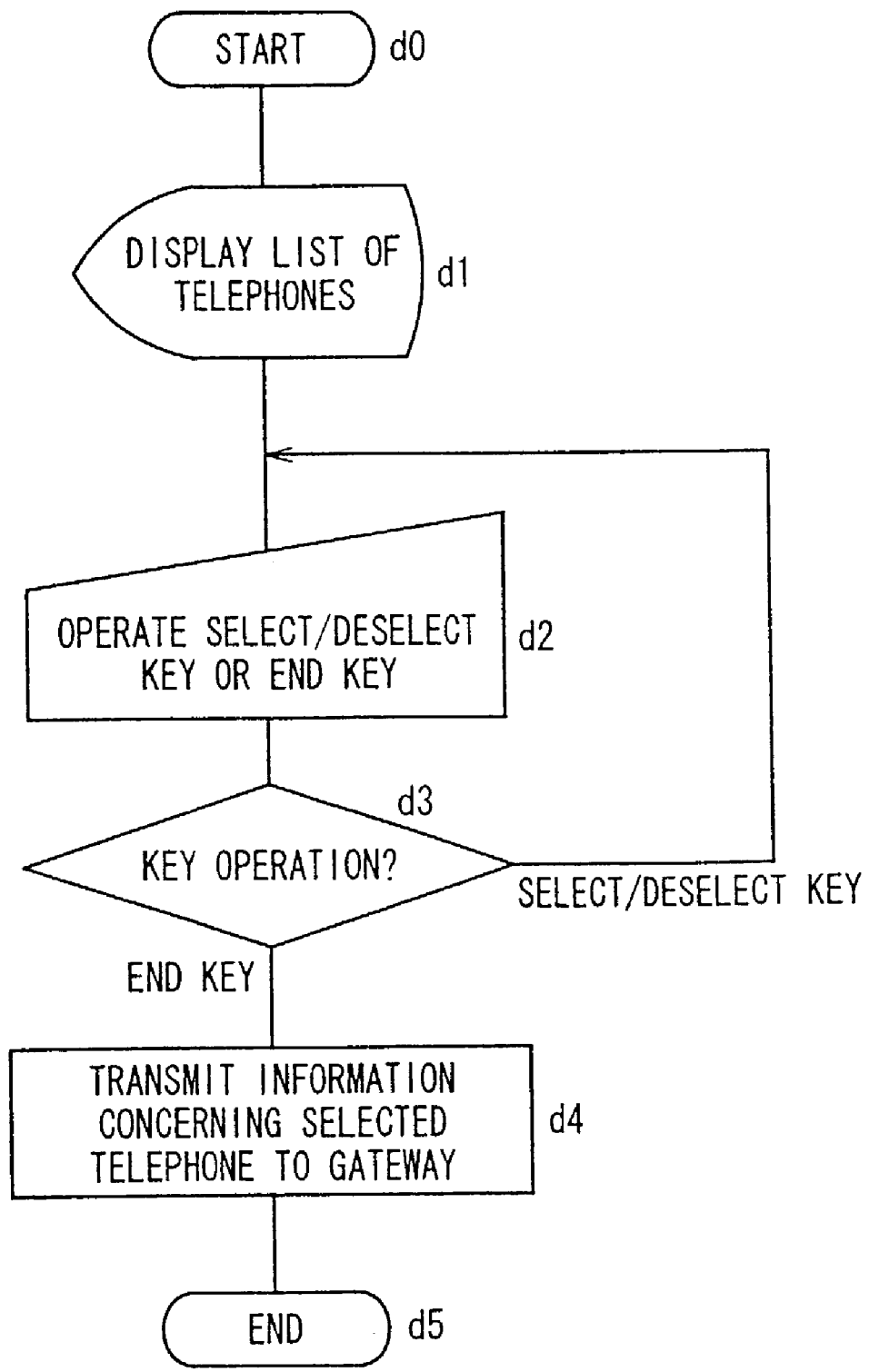
FIG. 9 is a flow chart illustrating the processing performed in the PDA of FIG. 1 to establish an association between the PDA terminal and a telephone terminal.
Figure 11:
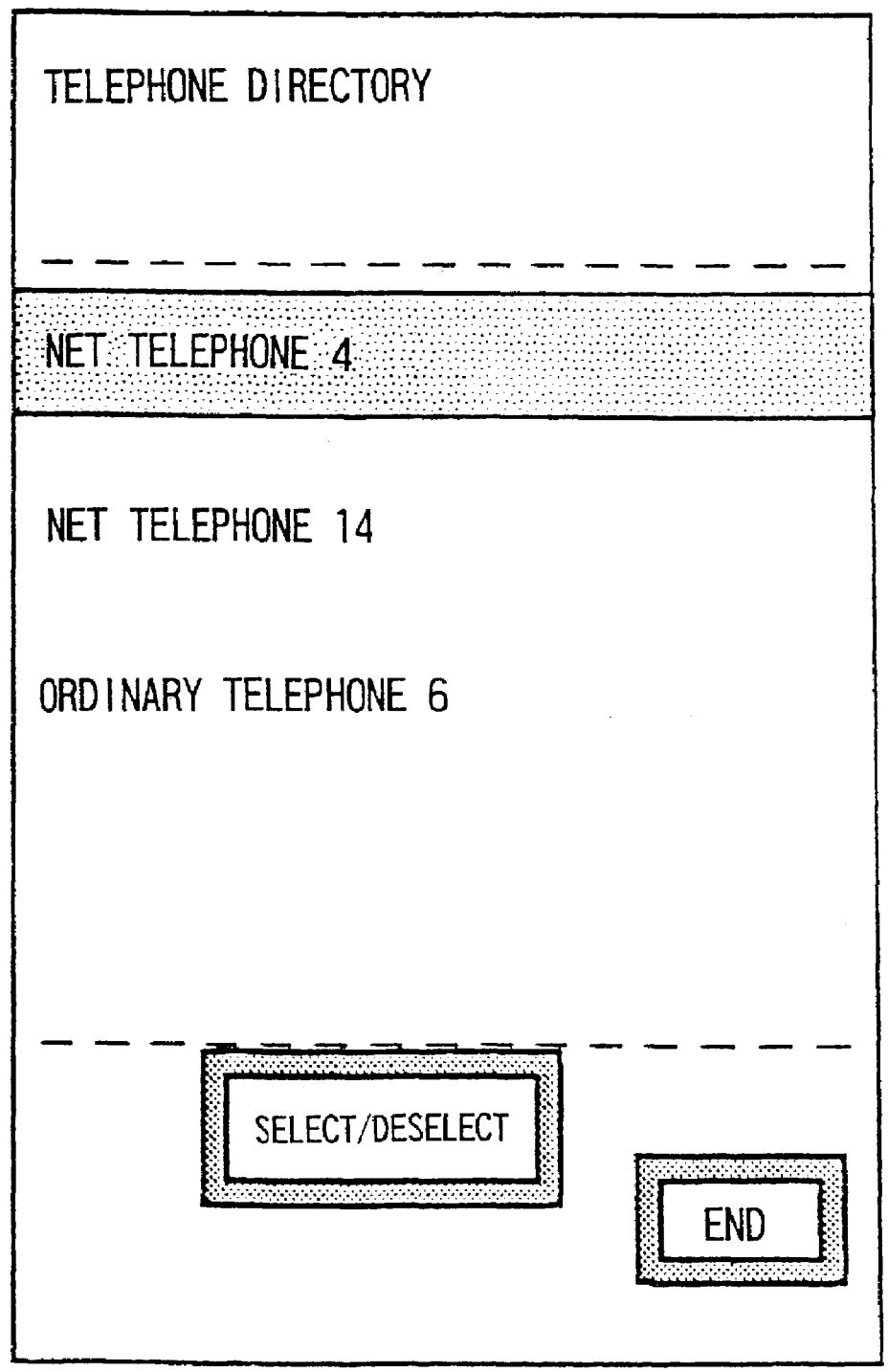
FIG. 11 is a view showing an example of a display produced on the PDA of FIG. 1 during the PDA terminal/telephone terminal association processing.

Next, the process for activating a telephone terminal registration mode by performing a specific operation on the PDA terminal will be described with reference to FIGS. 9, 10, and 11. FIG. 9 shows the processing procedure for registering a telephone terminal by using the PDA 2. FIG. 10 shows an example of the contents displayed on the display 22 of the PDA 2 in accordance with the registered association. Here,- the name of the called telephone terminal is displayed along with the calling telephone number and personal information as the calling party information. When the telephone terminal registration mode is entered at step d0, a list of telephones connected to the LAN 1 is displayed at step d1. An example of the display is shown in FIG. 11. In this condition, a select/deselect operation is performed at step d2 to select or deselect the telephone terminal an incoming call to which is to be indicated to the PDA 2. When an end operation is detected by checking the key operation at step d3, information concerning the selected telephone is transmitted to the gateway apparatus 3 at step d4, and the telephone terminal registration mode is terminated at step d5.

As is apparent from the above description, according to the network telephone system of the present embodiment comprising the gateway apparatus 3 and the PDAs 2, 12, 62, 72, and 82, the calling party information of which the called party is notified from the central office exchange at the time of a call arrival, or at the time of a second call arrival from a third party through call-waiting service, can be received at any designated telephone terminal connected to the LAN 1, and the call can be answered after checking the received information. Further, when a call arrives to any one of the preregistered telephones, the calling party information is displayed on the PDA terminal that the user carries, so that the user can check the calling party information even when he is away from the telephone. Furthermore, even when the user cannot answer an incoming call, the record of every incoming call to any preregistered telephone is stored in the PDA terminal that the user carries. In a system that records the incoming call history for each telephone terminal, the incoming call history has to be checked on each telephone terminal, but in the network telephone system of the invention, the incoming call history can be checked by just operating the PDA terminal that the user carries. Accordingly, for any incoming call to any telephone, the user can easily check the calling party by performing the same operation, and can return the call.

In the present embodiment, wireless portable information terminals have been used as the PDA terminals, but it will be appreciated that the terminals need not be PDA terminals specially designed for use with the network telephone system described above; instead, widely used general-purpose PDA terminals, when loaded with an application program, can be used as the PDA terminals according to the invention. Such an application program may be prestored in a ROM included in the memory 23 of the PDA 2 or may be downloaded using an information communication function. Many general-purpose PDA terminals are capable of connecting an external interface device such as a PC card slot, and the above function can be easily implemented using a commonly used wireless LAN technology.

Further, as previously shown in Table 1, not only the PDA terminals but also the personal computers 7 and 17 connected to the LAN 1 are associated with the corresponding telephones. Accordingly, when a call arrives, for example, to the NET telephone 14, a display such as shown in FIG. 10 is produced on the personal computer 7. This feature lets the user know the arrival of a call and check the calling party even when the user is working on the personal computer 7. When the LAN 1 is constructed using Home PNA or like technology, the notification of an incoming call and the calling party information can be displayed on a display apparatus on which video is being played back from a video tape or a DVD (Digital Versatile Disk).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for displaying calling party information received from an external public network, in which a telephone terminal for communication network connection and an information terminal are connected in a second network and the second network is connected to the external public network via a gateway apparatus comprising a protocol conversion function, the method comprising:

managing the telephone terminal and the information terminal by the gateway apparatus by associating the telephone terminal with the information terminal when a telephone number from the external public network is received by the gateway apparatus and transmitted from the gateway apparatus to the telephone terminal, when the calling party information transmitted from the external public network is received by the gateway apparatus, allowing the gateway apparatus to notify the information terminal associated with the telephone terminal to which the information is to be transmitted, of the received calling party information and transmitting the calling party information and information indicating the telephone terminal to which the calling party information is to be transmitted to the information terminal, and displaying the calling party information and the information indicating the telephone terminal to which the calling party information is to be transmitted on the information terminal which is notified of the calling party information.

2. The method of claim 1, wherein the calling party information is transmitted to the information terminal when an incoming call to the telephone terminal arrives from the external public network.

3. The method of claim 1, wherein the calling party information is transmitted to the information terminal when an interrupt request to the telephone terminal during a call occurs from a third party.

4. A network system comprising:
a network having:
at least one telephone terminal for communication network connection; and
an information terminal; and
a gateway apparatus comprising a protocol conversion function for connection of the network to an external public network, wherein
the gateway apparatus manages the telephone terminal and the information terminal by associating the telephone terminal with the information terminal when the gateway apparatus receives a telephone number from the external public network and transmits the received telephone number to the telephone terminal and, when calling party information transmitted from the external public network is received by the gateway apparatus, the gateway apparatus notifies the information terminal associated with the telephone terminal to which the information is to be transmitted, of the received calling party information and transmits the calling party information and information indicating the telephone terminal to which the calling party information is to be transmitted to the at least one information terminal, and
the information terminal which is notified of the calling party information displays the received calling party information and the information indicating the telephone terminal to which the calling party information is to be transmitted.

5. The network system of claim 4, wherein the external public network to which the gateway apparatus is connected includes at least two networks selected from among an analog telephone network, a packet communication telephone network, and a broadband telephone network.

6. The network system of claim 4, wherein the information terminal is a portable terminal that a user can carry, and communicates information with the gateway apparatus via a wireless link.

7. A gateway apparatus which, together with a telephone terminal for communication network connection and an information terminal, forms a network, and which comprises a protocol conversion function for connection of the network to an external public network, the gateway apparatus comprising:
managing means for managing the telephone terminal and the information terminal by associating the telephone terminal with the information terminal when a telephone number from the external public network is received by the gateway apparatus and transmitted from the gateway apparatus to the telephone terminal;
receiving means for receiving calling party information transmitted from the external public network; and
notifying means for searching through the managing means for the information terminal associated with the telephone terminal to which the calling party information received by the receiving means is to be transmitted, and transmitting the calling party information and information indicating the telephone terminal to which the calling party information is to be transmitted to the information terminal, notifying the searched information terminal of the received calling party information.

8. The gateway apparatus of claim 7, wherein the managing means manages the status of every connected information terminal by performing communication with the information terminal at predetermined intervals of time, and
when the information terminal which is to be notified of the calling party information does not respond to the communication from the managing means, the notifying means stores the calling party information of which the information terminal is to be notified, and when a response from the information terminal to the managing means is detected, the notifying means notifies the information terminal of the stored calling party information.

9. The gateway apparatus of claim 7, wherein the gateway apparatus is capable of connecting to at least one external public network selected from among an analog telephone line, a packet communication telephone network, and a broadband telephone network.

10. An information terminal connectable to a network which includes a telephone terminal for communication network connection and a gateway apparatus comprising a protocol conversion function for connection of the network to an external public network and for routing of a telephone number, transmitted from the external public network and received by the gateway apparatus, to the telephone terminal, the information tenninal comprising:
information managing means for receiving the telephone number from the gateway apparatus and for determining calling party information including a name associated with the calling party based on the received telephone number; and
display control means for displaying the telephone number transmitted from the external public network and received by the gateway apparatus together with the calling party information including the name associated with the calling party and information indicating the telephone terminal on the information terminal when the information terminal is notified of the received telephone number from the gateway apparatus.

11. The information terminal of claim 10, wherein said information managing means manages personal information including calling party names and telephone numbers as a data base, and
wherein, when the information terminal is notified of a telephone number from the gateway apparatus, the display control means searches the data base in the information managing means and, if personal information that matches the telephone number is found, performs control so as to display the thus found personal information as the calling party information together with information that identifies the telephone terminal to which the telephone number is directed.

12. The information terminal of claim 10, further comprising information storing means for storing telephone number information received from the gateway apparatus, and
wherein, when a predetermined operation is performed, the display control means performs control so that the telephone number information stored in the information storing means is displayed in the form of an incoming call history.

13. The information terminal of claim 10, further comprising sounding means for sounding a ringing tone when the information terminal is notified of the telephone number from the gateway apparatus.

14. A computer readable recording medium storing a computer program having instructions for causing a computer to function as an information terminal, the instructions when executed perform steps comprising:

receiving a telephone number of which the information terminal is notified from a gateway apparatus receiving the telephone number which is transmitted from an external public network to a telephone terminal via the gateway, determining calling party information including a calling party name based on the received telephone number, and displaying the telephone number together with calling party information of which the information terminal is notified and information indicating the telephone terminal, on display means, said calling party information including the calling party name associated with a calling party.

15. The computer readable recording medium of claim 14, further comprising:

when the information terminal is notified of a telephone number from the gateway apparatus, searching a data base in an information managing means for managing personal information including calling party names and telephone numbers as the data base and, when personal information that matches the telephone number is found, displaying the thus found personal information together with information that identifies the telephone terminal to which the telephone number is directed.

16. The computer readable recording medium of claim 14, further comprising:

when a predetermined operation is performed, displaying the calling party information stored in information storing means for storing the calling party information for telephone numbers received from the gateway apparatus, in the form of an incoming call history.

17. The computer readable recording medium of claim 14, further comprising:

sounding a ringing tone when the information terminal is notified of the telephone number from the gateway apparatus.

18. A computer readable recording medium including a program having instructions recorded thereon for causing a computer to function as an information terminal, the instructions when executed perform steps comprising:

receiving a telephone number of which the information terminal is notified from a gateway apparatus receiving the telephone number which is transmitted from an external public network to a telephone terminal via the gateway apparatus, determining calling party information including a calling party name based on the received telephone number, and displaying the telephone number together with calling party information of which the information terminal is notified and information indicating the telephone terminal, on display means, said calling party information including the calling party name.

19. The computer readable recording medium of claim 18, wherein the program further comprises:

when the information terminal is notified of a telephone number from the gateway apparatus, searching a data base in an information managing means for managing personal information including calling party names and telephone numbers as the data base and, when personal information that matches the telephone number is found, displaying the thus found personal information together with information that identifies the telephone terminal to which the telephone number is directed.

20. The computer readable recording medium of claim 18, wherein the program further comprises:

when a predetermined operation is performed, displaying the calling party information stored in an information storing means for storing calling party information for telephone numbers received from the gateway apparatus, in the form of an incoming call history.

21. The computer readable recording medium of claim 18, wherein the program further comprises:

sounding a ringing tone when the information terminal is notified of the telephone number from the gateway apparatus.

22. The method of claim 1, wherein the telephone number is routed from the external public network to the telephone terminal by the gateway apparatus.

23. The network system of claim 4, wherein the gateway apparatus routes the telephone number received from the external public network to the telephone terminal.

24. The gateway apparatus of claim 7, further including routing means for routing the telephone number received from the external public network to the telephone terminal.

* * * * *